No. 740,184. PATENTED SEPT. 29, 1903.
W. D. SAINSBURY.
ANTISKIDDING DEVICE FOR VEHICLE WHEELS.
APPLICATION FILED JUNE 13, 1903.
NO MODEL.
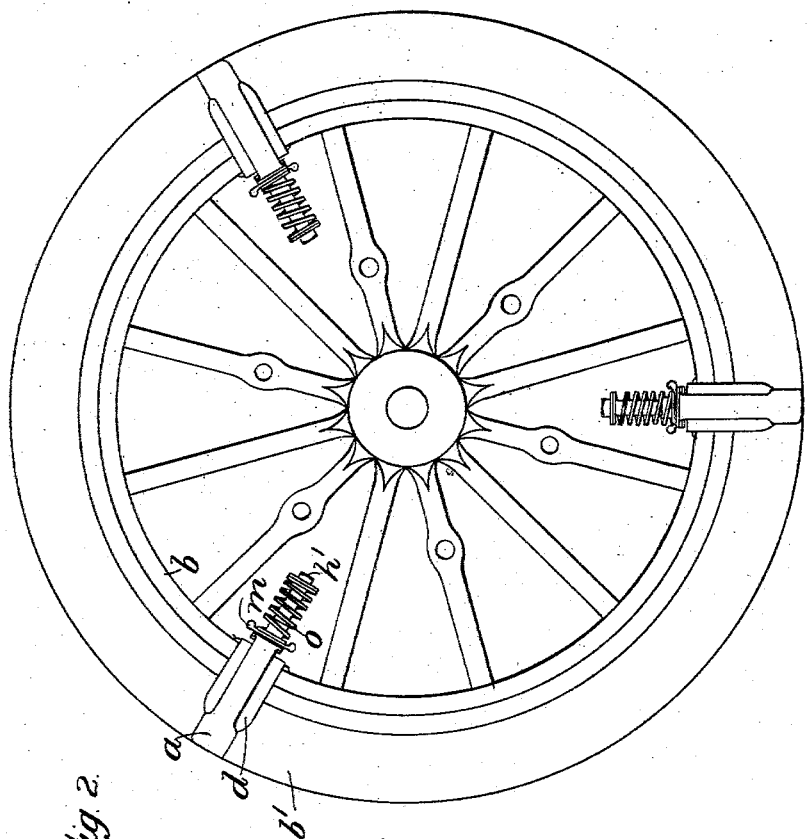
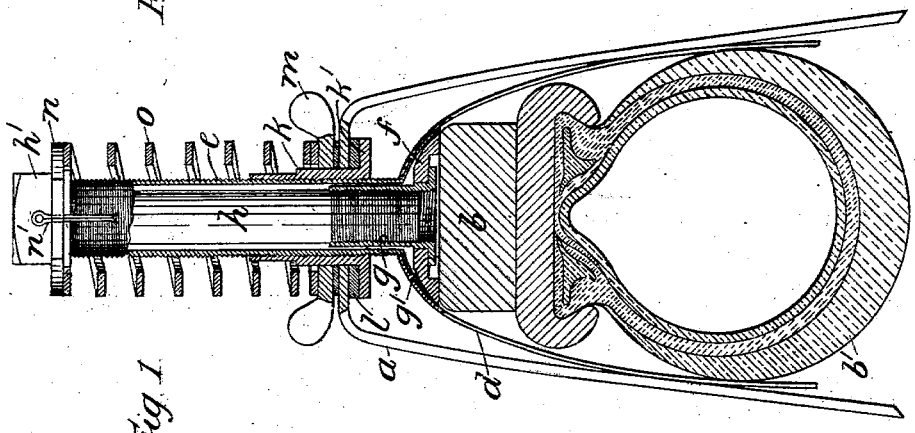

No. 740,184. Patented September 29, 1903.

UNITED STATES PATENT OFFICE.

WILLIAM DRAPER SAINSBURY, OF DUBLIN, IRELAND.

ANTISKIDDING DEVICE FOR VEHICLE-WHEELS.

SPECIFICATION forming part of Letters Patent No. 740,184, dated September 29, 1903.

Application filed June 13, 1903. Serial No. 161,401. (No model.)

*To all whom it may concern:*

Be it known that I, WILLIAM DRAPER SAINSBURY, a subject of the King of the United Kingdom of Great Britain, residing at 27 Westmoreland street, Dublin, Ireland, have invented a certain new and useful Device for Preventing Skid of Vehicle-Wheels, of which the following is a specification.

This invention relates to a device for preventing skid of vehicle-wheels, such as those of motor-cars; and it has more especially for its object to provide a construction comprising treadward-projecting horns attached to the rim of the wheel and which in normal running of the car are adapted to rise and fall with the tire without injury to the latter, but which when the tire skids, side slips, or rolls will come in rigid contact with the ground, dragging sidewise thereon to prevent such skidding or side slip.

A further object of the invention is to provide a construction which can be readily detached from the wheel altogether and in which also without completely detaching the device the projecting horns can be raised out of contact with the ground when desired.

In the accompanying drawings, which illustrate the invention, Figure 1 is a vertical section of the improved device, showing a wheel rim and tire, also in section. Fig. 2 is a side elevation of a motor-car wheel fitted with three of such devices.

As shown in the drawings, the device, a number of which are preferably mounted on the wheel-rim at equal intervals, comprises a U-shaped bridge $a$, of metal or other rigid material, embracing the rim $b$ of the wheel and the divergent horns of which project toward the tread on either side of the rim and clear of the tire $b'$ and may assume any convenient form, such as shown. This U-shaped body is adjustably mounted on the wheel-rim $b$; but when it is intended to provide against skidding of the wheel it is set in a position such as shown in Fig. 1, the horns extending to or somewhat beyond the tread of the tire $b'$.

To serve as a liner between the tire $b'$ and the horns $a$, which contacting with the ground rise and fall with the tire $b'$ on account of their resilient connection with the rim, is interposed a plate $d$, of brass or other metal or suitable material of U or other suitable shape, which is mounted stationarily relative to the rim and which receives the friction of the moving horns which would otherwise wear out the tire. To this liner $d$ is rigidly connected a tubular shank $e$, screw-threaded externally, as shown, and which passes through the arch of the U-shaped body, which moves up and down relatively to said shank.

Fixed to the rim $b$ is a metal or like plate $f$, through an orifice in which plate $f$ and liner $d$ passes the stem of a tubular socket $g$, the said socket $g$ being prevented from completely passing through said plate $f$ by a flange $g'$. Passing through the tubular shank $e$ is a screw-pin $h$, the nose of which engages internal screw-threads in the socket $g$ and whose head $h'$ abuts against the free extremity of the shank $e$, so as to provide a more or less rigid connection between the shank $e$ and the rim $b$ of the wheel. Surrounding the lower part of the shank $e$ is a sleeve $k$, screw-threaded internally to engage said shank and whose stem passes freely through the central orifice in the plate, which plate rests against the flange $k'$ of the sleeve $k$ or against an interposed washer $l$. Engaging the sleeve $k$ above the U-shaped body $a$ is a wing-nut $m$, rotation of which, and consequent rotation of the sleeve $k$, traverses the latter along the shank $e$ and at the same time moves the U-shaped body $a$ up or down relatively to the shank. Fixed to the free end of the shank against the head of the screw-pin $h$ is a washer $n$, through which passes a split pin $n'$ to prevent the said screw-pin $h$ from turning, and surrounding the shank $e$ between the washer $n$ and the wing-nut $m$ is a helical spring $o$ under compression, the effect of which is to provide a resilient connection between the horns $a$ and the rim $b$ of the wheel, for when the extremities of the said horns are pressed on the ground the horns are forced upward, the arch traveling along the sleeve $k$ and moving the wing-nut $m$ to further compress the spring $o$, which when the pressure is relieved depresses the horns to abut against the washer $l$.

The tension of the spring may be varied by rotating the wing-nut $m$, and therewith the sleeve *k*, so as to vary the distance between the latter and the washer *n* and lower the prongs to compensate for wear.

When not required, the device can be detached by unscrewing the screw-pin *h*, in which case a cap is supplied to close the socket *g*, or by screwing up the wing-nut *m* the horns *a* can be raised clear of the ground, so that the tire alone makes contact therewith.

It will be understood that in rotation of the wheel, in which a plurality of such devices may be provided, the horns *a* will roll over the ground during normal forward travel of the vehicle and owing to their resilient connection with the rim *b* will rise and fall with the tire *b'* without giving rise to undue resistance; but if the tire skids, slips, or rolls the horns *a* will not yield, but will drag sidewise on the ground and prevent such skidding.

Having now described my invention, what I claim, and desire to secure by Letters Patent, is—

1. A device for preventing skid of vehicle-wheels comprising in combination a body movably mounted on the wheel-rim and projecting outwardly therefrom, a resilient connection between said body and said rim and a liner stationary relative to said rim and interposed between said movable body and the wheel-tire to allow said movable body to rise and fall with the tire without injuring the latter.

2. The herein-described device for preventing skid of vehicle-wheels comprising in combination horns embracing the wheel-rim and diverging therefrom, and a resilient connection between said horns and said rim, said horns being adapted to rise and fall with the tire without injury to the latter in normal rotation of the wheel and to act sidewise on the ground to prevent skidding when the wheel slips.

3. A device for preventing skid of vehicle-wheels comprising in combination horns embracing the wheel-rim and projecting outwardly therefrom, a resilient connection between said horns and said rim and a liner stationary relative to said rim and interposed between said horns and the wheel-tire as and for the purpose set forth.

4. The herein-described device for preventing skid of vehicle-wheels comprising in combination a U-shaped body embracing the wheel-rim and projecting outwardly therefrom, a resilient body interposed between said U-shaped body and said rim, a liner mounted on said rim and interposed between said U-shaped body and the wheel-tire for the purpose set forth.

5. The herein-described device for preventing skid of vehicle-wheels comprising in combination a U-shaped body *a* embracing the wheel-rim and projecting outwardly therefrom, resilient means interposed between said U-shaped body and said rim, and a U-shaped liner *d* connected to said rim and inclosed by said U-shaped body between it and the wheel-tire for the purpose set forth.

6. A device for preventing skid of vehicle-wheels comprising in combination a U-shaped body movably mounted on the wheel-rim, a liner stationary relative to said rim, and interposed between it and the wheel-tire, a resilient connection between said U-shaped body and said rim, and a rigid connection between said liner and said rim, said connecting means being adapted to be disengaged to remove the device from the wheel when required.

7. The herein-described device for preventing skid of vehicle-wheels comprising in combination a U-shaped body embracing the wheel-rim and projecting outwardly therefrom, a shank passing through an orifice in said U-shaped body, a spring interposed between the end of said shank and said U-shaped body, and a liner stationary relative to the rim and fixed to said shank interposed between said U-shaped body and the wheel-tire, for the purpose set forth.

8. The herein-described device for preventing skid of vehicle-wheels comprising in combination a U-shaped body embracing the wheel-rim and projecting outwardly therefrom, a shank passing through said U-shaped body, a spring interposed between the end of said shank and said U-shaped body, means for regulating the tension of said spring, and adjusting the position of said U-shaped body, and a liner stationary relative to said rim and fixed to said shank, being interposed between the wheel-tire and said U-shaped body for the purpose set forth.

9. The herein-described device for preventing skid of vehicle-wheels comprising in combination a U-shaped body embracing the wheel-rim and projecting outwardly therefrom, a plate secured to said rim, a liner interposed between said U-shaped body and the wheel-tire, a shank passing through an orifice in said U-shaped body and secured to said liner, a rigid connection between said shank and said plate and a resilient connection between said shank and said U-shaped body for the purpose set forth.

10. The herein-described device for preventing skid of vehicle-wheels comprising in combination a U-shaped body embracing the wheel-rim and projecting outwardly therefrom, a plate secured to said rim, a liner interposed between said U-shaped body and the wheel-tire, a shank passing through an orifice in said U-shaped body and secured to said liner, a rigid connection between said shank and said plate, a spring interposed between said shank and said U-shaped body and means for regulating the tension of said spring and adjusting the position of said U-shaped body for the purpose set forth.

11. The herein-described device for preventing skid of vehicle-wheels comprising in combination a U-shaped body embracing the wheel-rim and projecting outwardly therefrom, a plate secured to said rim, a liner interposed between said U-shaped body and the wheel-tire, a shank secured to said liner, a screw-threaded sleeve whose end passes freely through an orifice in said U-shaped body engaging said shank, a rigid connection between said shank and said plate and a resilient connection between said shank and said U-shaped body for the purpose set forth.

12. The herein-described device for preventing skid of vehicle-wheels comprising in combination a U-shaped body surrounding the wheel-rim and projecting outwardly as shown, a plate secured to said rim, a liner interposed between said U-shaped body and the wheel-tire, a shank secured to said liner and passing through an orifice in said U-shaped body a socket whose stem passes through said plate, a rigid connection between the shank and the rim and a resilient connection between the shank and said U-shaped body for the purpose set forth.

13. The herein-described device for preventing skid of vehicle-wheels comprising in combination a U-shaped body embracing the wheel-rim and projecting outwardly therefrom, a plate secured to said rim, a liner interposed between said U-shaped body and the wheel-tire a tubular shank secured to said liner and passing through an orifice in said U-shaped body a socket whose stem passes through said plate, a screw-pin passing through the tubular shank engaging said socket and whose head abuts on the end of said shank, and a spring interposed between said head and said U-shaped body for the purpose set forth.

14. The herein-described device for preventing skid of vehicle-wheels comprising in combination a U-shaped body embracing the wheel-rim and projecting outwardly therefrom, a plate secured to said rim, a liner interposed between said U-shaped body and the wheel-tire, a tubular shank secured to said liner and passing through an orifice in said U-shaped body a socket whose stem passes through said plate, a screw-pin passing through said tubular shank engaging said socket and whose head abuts on the end of said shank, a spring interposed between said head and said U-shaped body and means for regulating the tension of said spring and adjusting the position of said U-shaped body for the purpose set forth.

15. The herein-described device for preventing skid of vehicle-wheels comprising in combination a U-shaped body embracing the wheel-rim and projecting outwardly therefrom a plate secured to said rim, a liner interposed between said U-shaped body and the wheel-tire, a screw-threaded tubular shank attached to said liner, a socket whose stem passes through said plate, a screw-pin passing through said tubular shank and engaging said socket, the head of said screw-pin abutting on the free end of said shank, a sleeve screw-threaded internally engaging said shank and whose stem passes freely through said U-shaped body, and a spring interposed between the head of said screw-pin and said U-shaped body, for the purpose set forth.

16. The herein-described device for preventing skid of vehicle-wheels comprising in combination a U-shaped body embracing the wheel-rim and projecting outwardly therefrom, a plate secured to said rim, a liner interposed between said U-shaped body and the wheel-tire, a screw-threaded tubular shank attached to said liner, a socket screw-threaded internally whose stem passes through said plate, a screw-pin passing through said tubular shank and engaging said screw-threaded socket, the head of said screw-pin abutting on the end of said shank, a sleeve screw-threaded internally engaging said shank, the stem of said sleeve passing freely through an orifice in said U-shaped body and a flange on said sleeve remaining between said U-shaped body and the saddle of the liner, a wing-nut adapted to rotate the said sleeve on said shank, and a helical spring interposed between said wing-nut and the head of the screw-pin for the purpose set forth.

17. The herein-described device for preventing skid of vehicle-wheels comprising in combination a U-shaped body embracing the wheel-rim and projecting outwardly, a plate secured to said rim, a liner interposed between said U-shaped body and the wheel-tire, a screw-threaded tubular shank secured to said liner a socket screw-threaded internally whose stem passes through said plate, a screw-pin passing through said tubular shank and engaging said socket, the head of said screw-pin abutting on the end of said shank, a washer surrounding the end of said shank, means for holding the screw-pin against rotation, a sleeve screw-threaded internally engaging said shank, the stem of said sleeve passing freely through an orifice in said U-shaped body and a flange on said sleeve remaining between said U-shaped body and the saddle of the liner, a wing-nut adapted to rotate the said sleeve on said shank, and a helical spring interposed between the washer at the free end of the shank and the wing-nut for the purpose set forth.

In witness whereof I have hereunto set my hand in presence of two witnesses.

WILLIAM DRAPER SAINSBURY.

Witnesses:
W. LONG,
PATRICK McSWINEY.